INVENTORS
JAMES A. HARDMAN
ROSS W. ESKELSON

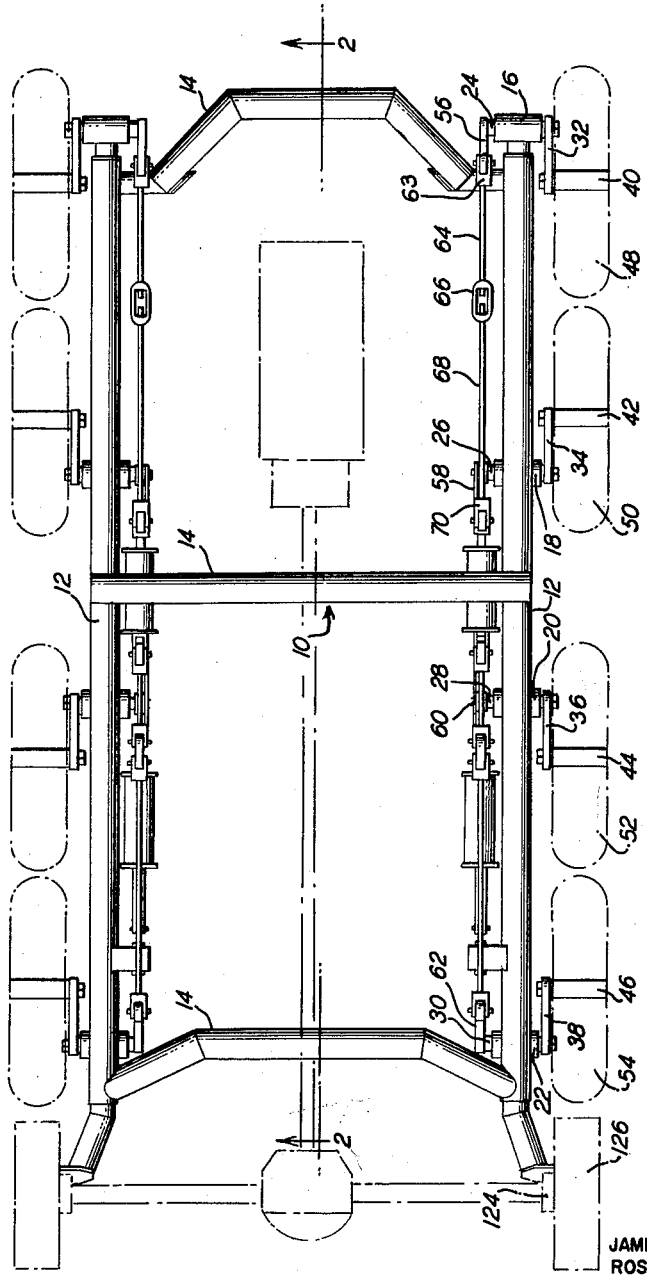

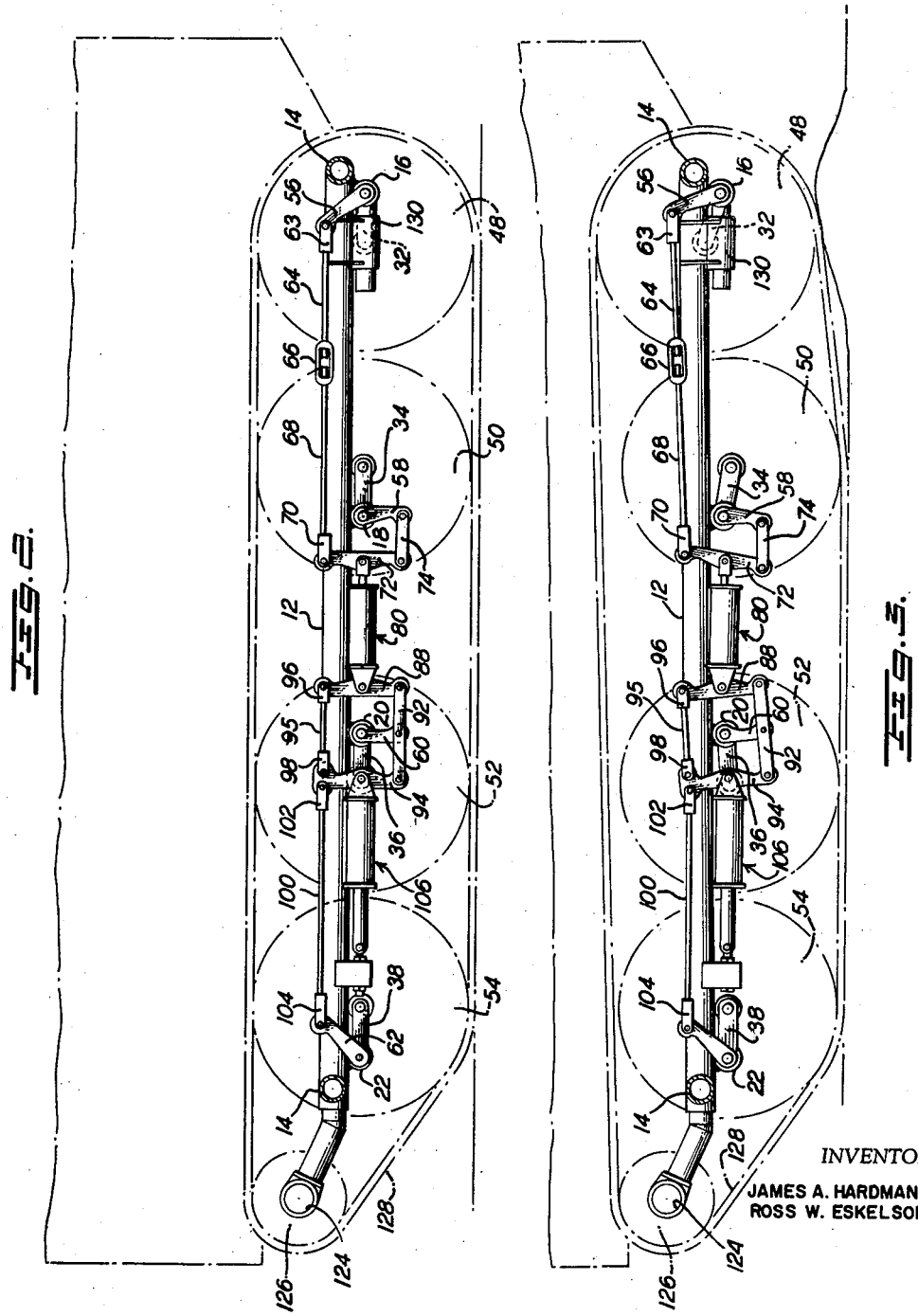

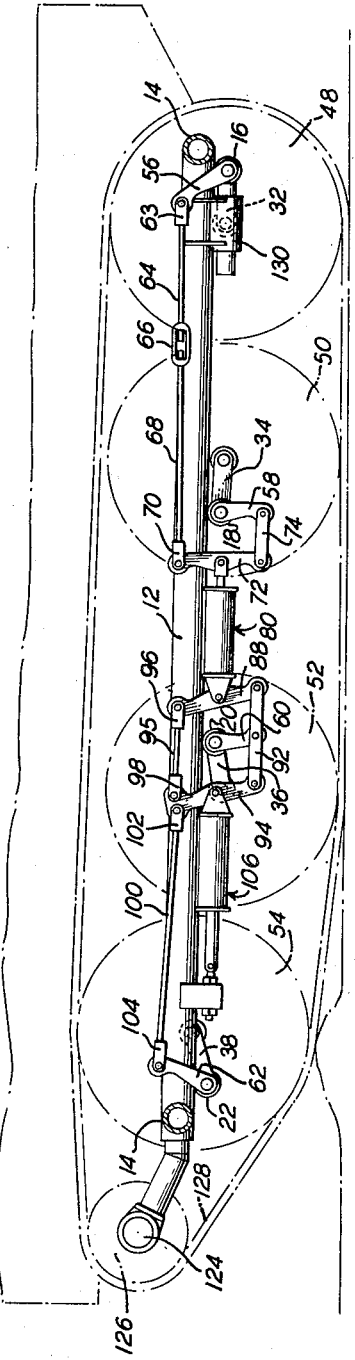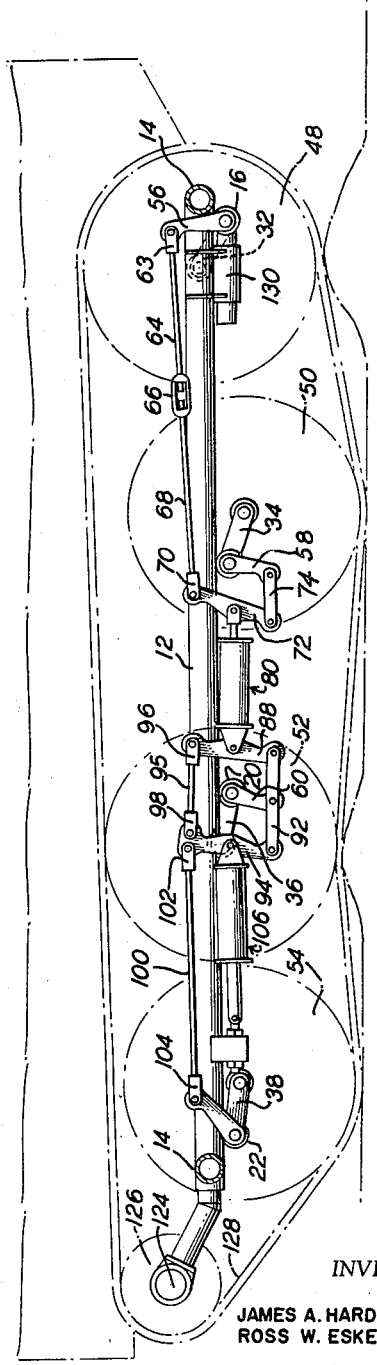

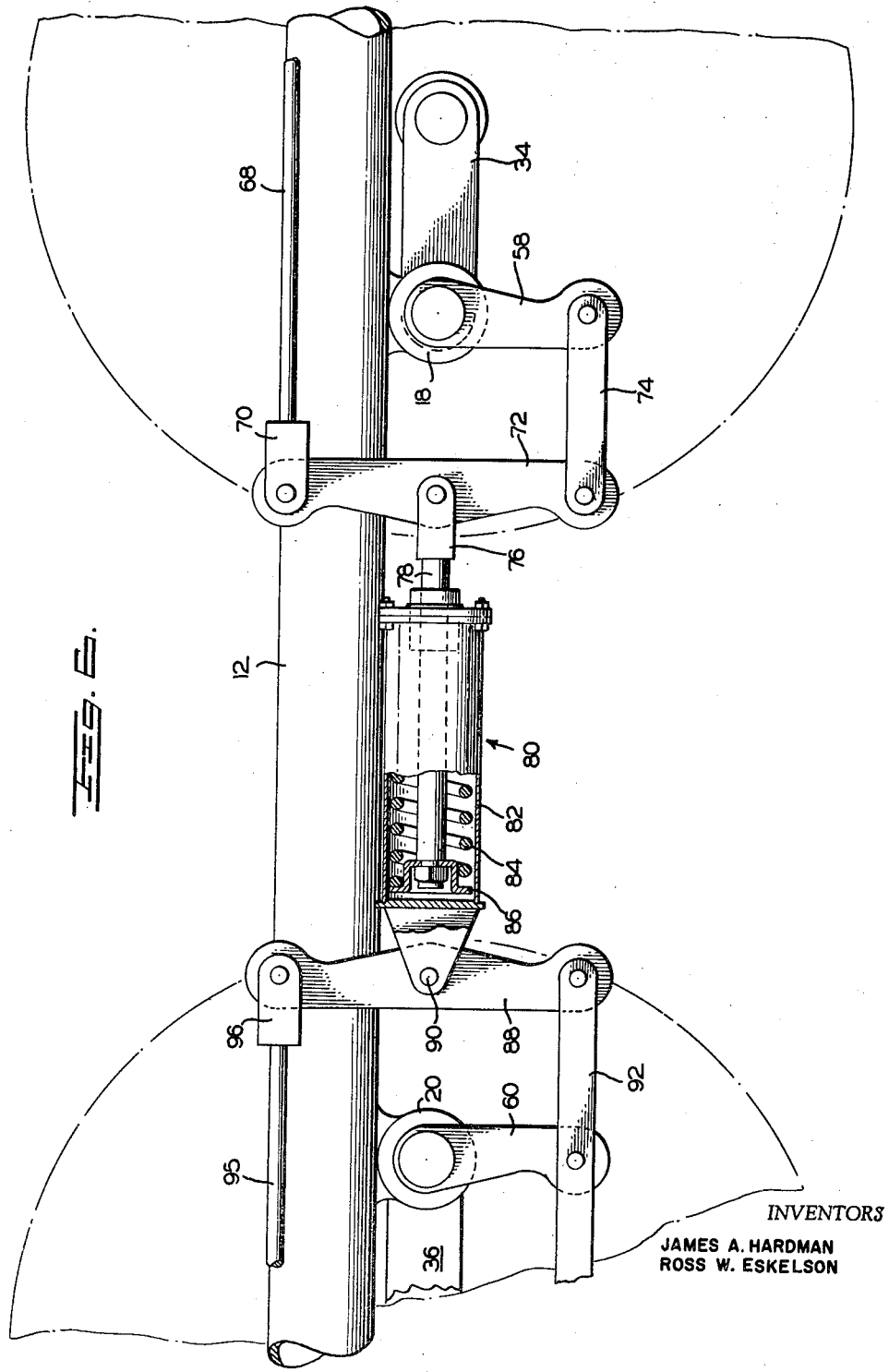

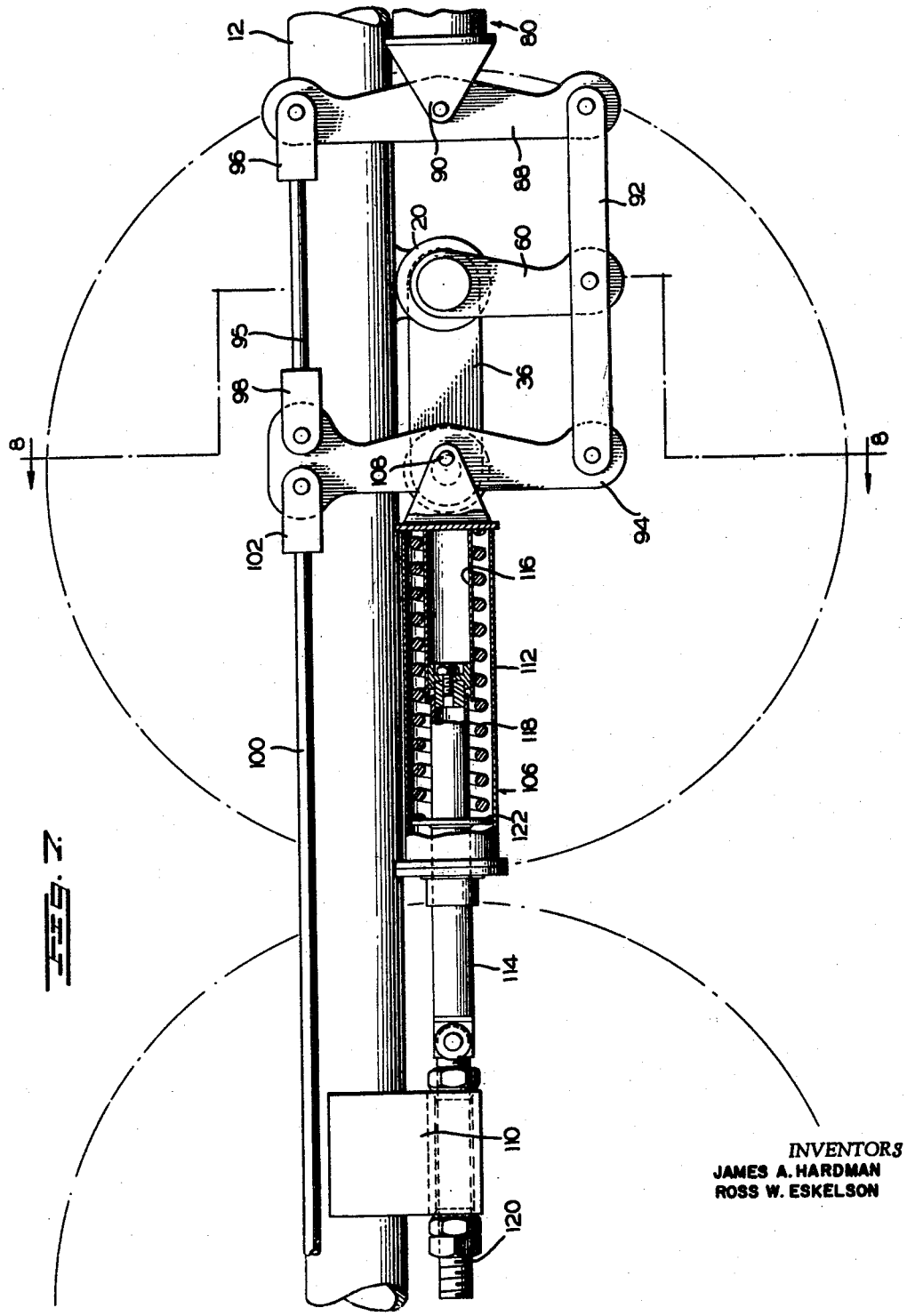

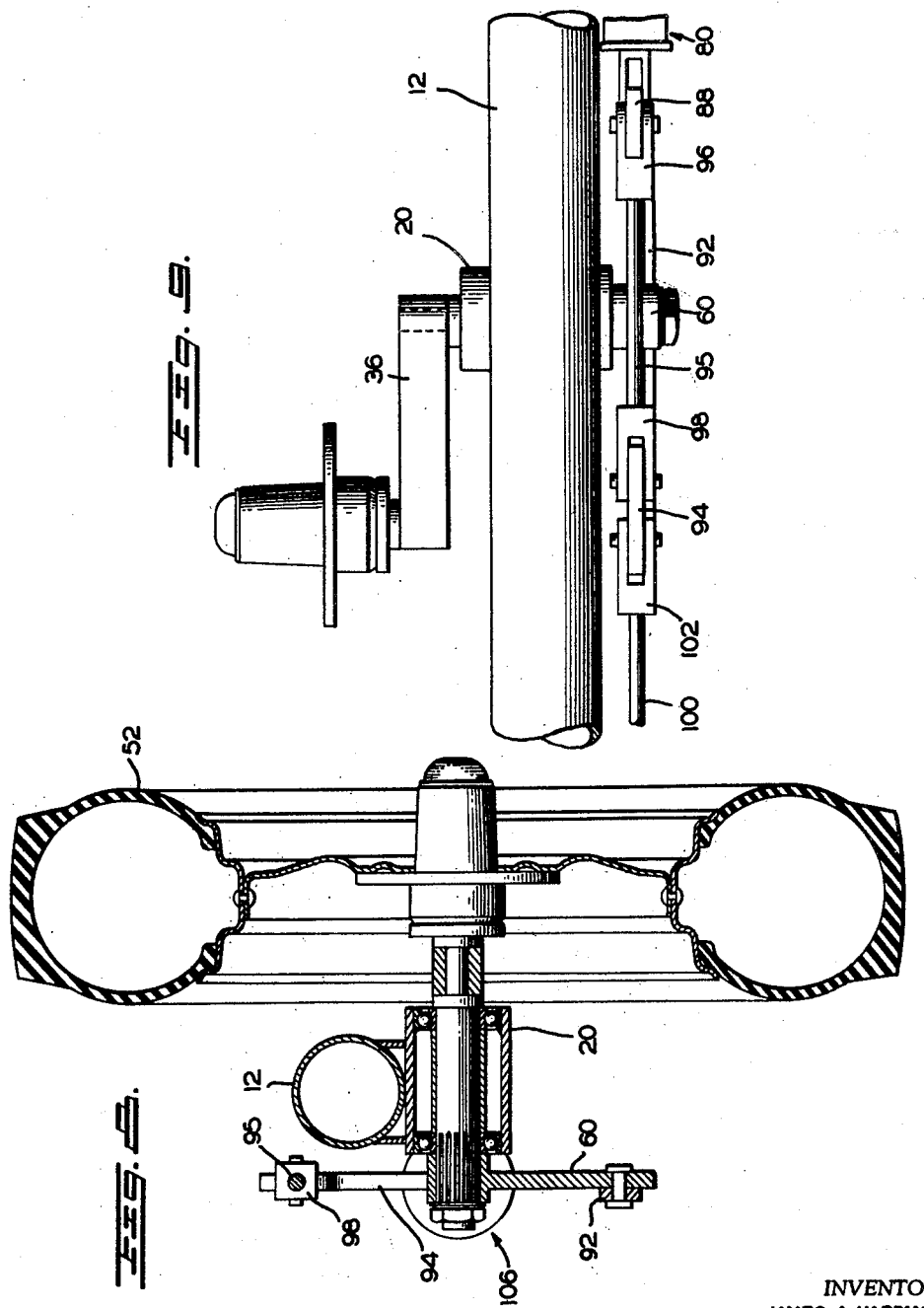
INVENTORS
JAMES A. HARDMAN
ROSS W. ESKELSON

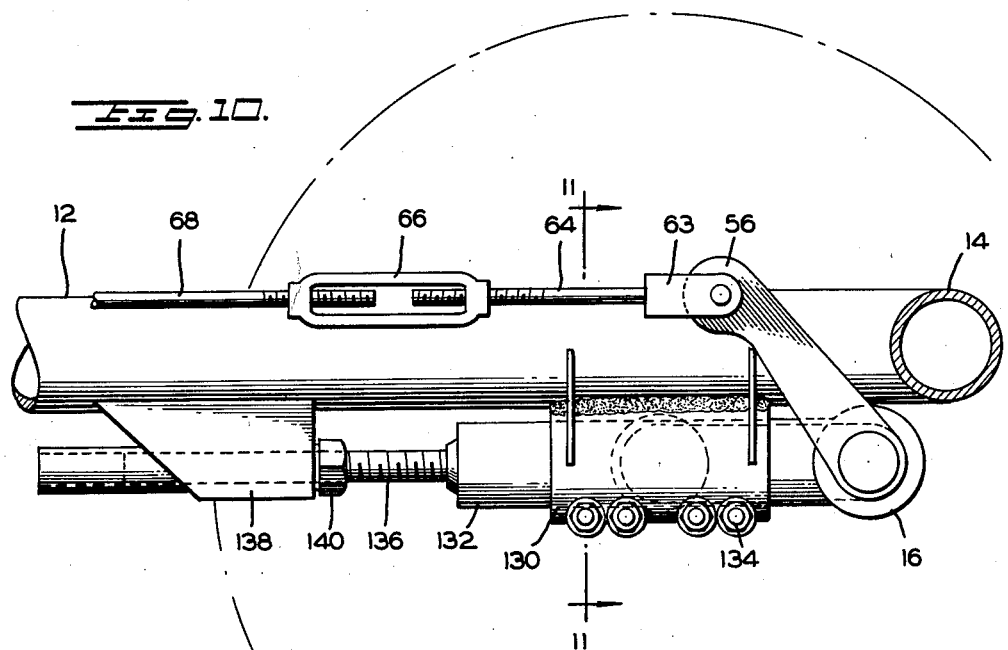
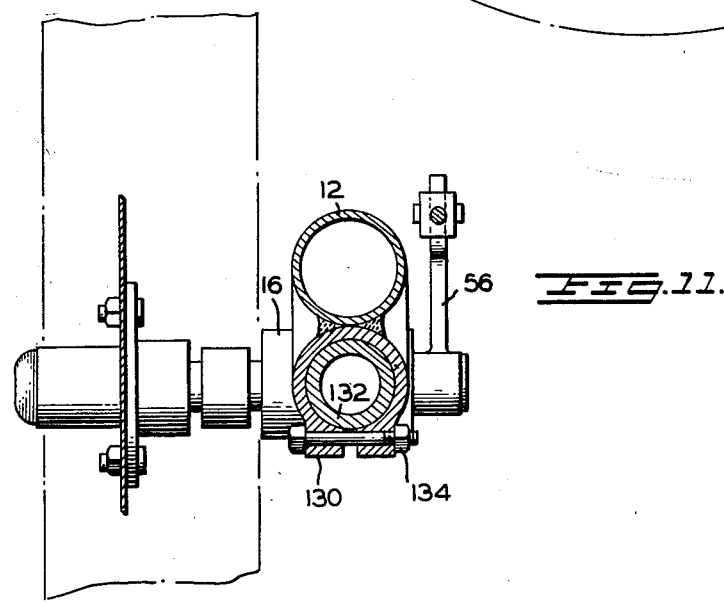

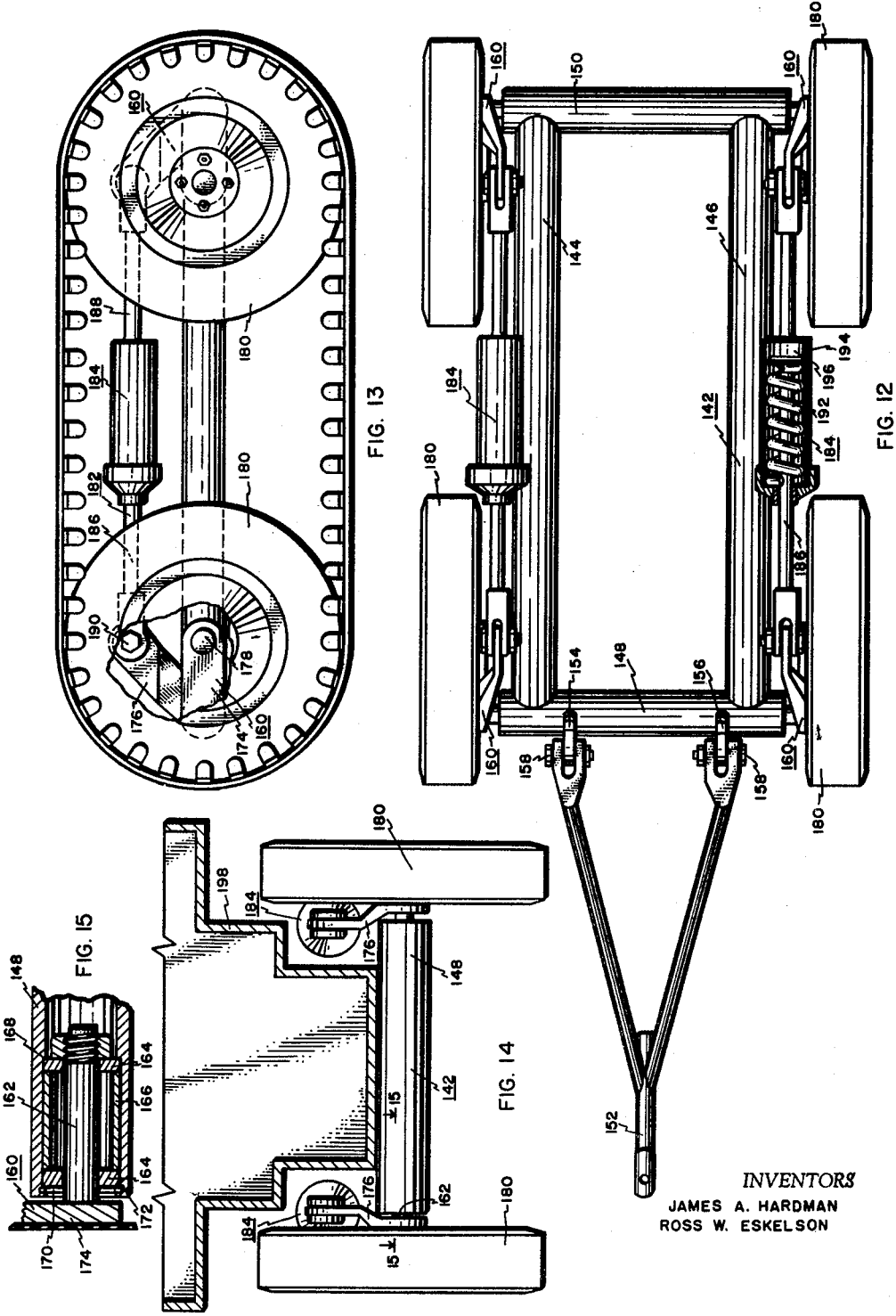

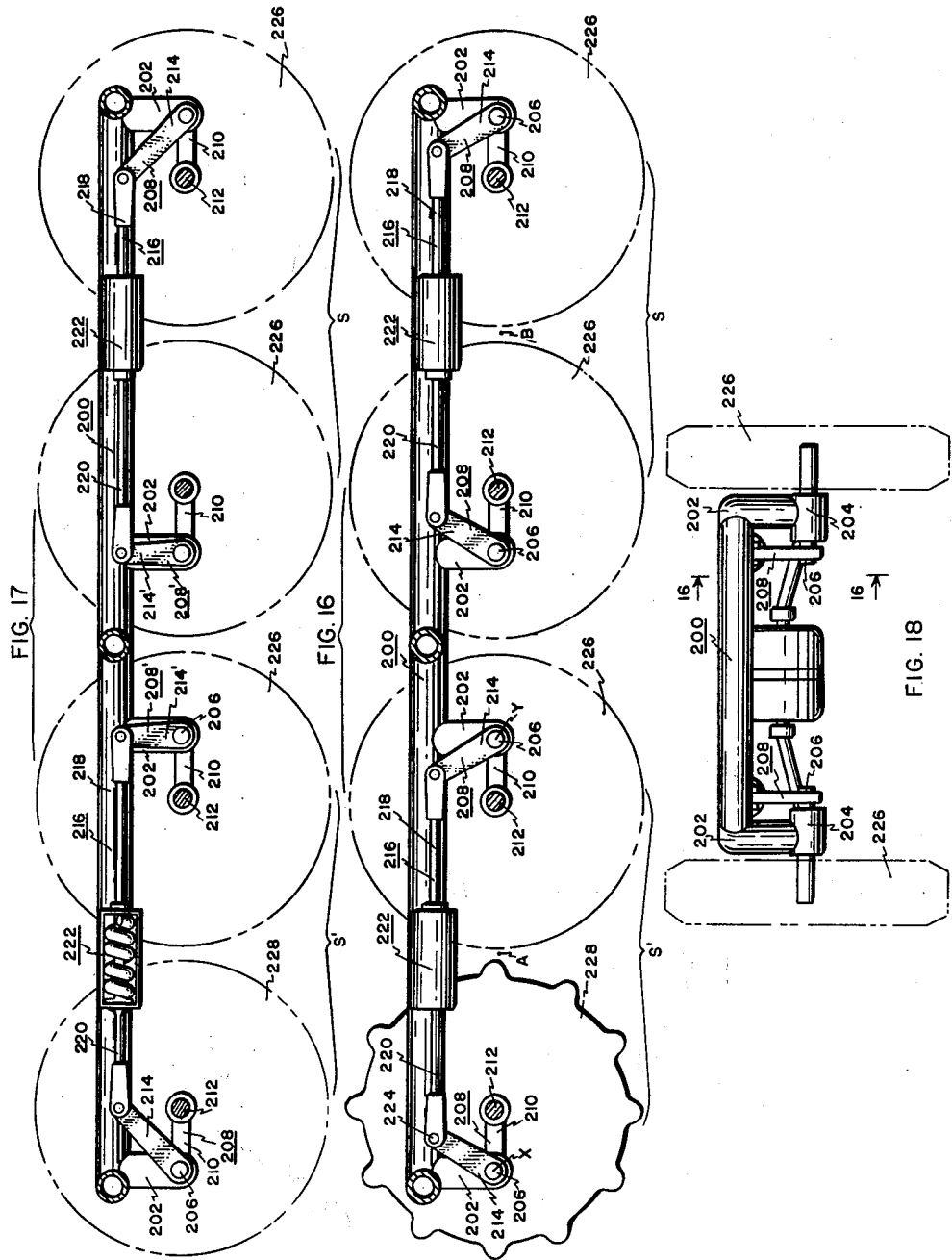

United States Patent Office 3,165,331
Patented Jan. 12, 1965

3,165,331
WHEEL SUSPENSION SYSTEM
James A. Hardman, Logan, and Ross W. Eskelson,
Centerville, Utah, assignors to Utah Scientific Research
Foundation, a non-profit corporation of Utah
Filed Sept. 25, 1961, Ser. No. 140,983
10 Claims. (Cl. 280—104)

This is a continuation-in-part of allowed application entitled Wheel Suspension System, filed December 4, 1957, Serial No. 700,712 which is now abandoned.

The present invention relates generally to a wheel suspension system, and more particularly, to a suspension system for multi-wheeled vehicles wherein the stress of the wheel suspension is distributed uniformly through a supporting frame.

It is a principal object of this invention to produce a wheel suspension system in cooperation with a tubular frame wherein the stress of the wheel suspension can be borne by the frame along a frame tube where the major stress results in a compression force along the tube.

Another object of the invention is to produce a wheel suspension system including means for adjusting associated endless track means and compensating means in the linkage for the various adjustments of the front wheels.

It is another object of the invention to produce a wheel suspension system wherein there is provided, as integral elements of the system, spring means which tend to urge the rear end of the system upwardly to compensate for an impressed load.

Still another object of the invention is to produce a wheel suspension system provided with a spring means for effectively spring-cushioning each wheel individually or all simultaneously as the occasion may require.

A further object of the invention is the production of a wheel suspension system wherein the ease of replacement and simplicity of design will permit long periods of service without interruption.

A further object of the present invention is to provide a wheel suspension system comprising either an interlinked series of wheels on respective sides of the vehicle frame, or comprising one or more sets of tandem-connected and reciprocatively operating wheels, wherein the effective wheel base is lengthened, the load carrying capacity of the suspension system and frame structure is increased during intervals of wheel displacement through the imposition of impact wheel loads, wherein back-and-forth rocking action of the vehicle is minimized while the vehicle is traversing rough terrain, and wherein jarring due to impact wheel loads is minimized by a force distribution through the frame which will preclude the imposition of excessive shear loads upon the frame, and wherein the wheel suspension system is such as to offer restoring, stabilizing forces so as to re-orient quickly the vehicle to normal operating position once a bump in the terrain has been traversed.

These and other objects may be effectively accomplished by a series of wheels, a series of bearing assemblies secured to the frame, novel, wheel-supporting-and-linkage arm means, of unique angular configuration, attached to the axles of each of the wheels for uniquely rockably mounting the wheels to the bearing assemblies, and linkage means pivotally interconnecting the arm means whereby vertical movement of any of the wheels is transmitted proportionally along the frame, effective wheel base is lengthened, load carrying capacity of a displaced wheel is increased, and frame rocking is minimized.

These and other object of the invention will be apparent from the following description and accompanying drawings which serve to illustrate an embodiment of the invention.

FIGURE 1 is a top plan view of the wheel suspension system of the invention.

FIGURE 2 is an elevational view of a section taken along line 2—2 of FIGURE 1.

FIGURE 3 is a view similar to FIGURE 2 and is illustrative of the positions assumed by the elements of the system when the front wheel encounters an incline or bump.

FIGURE 4 is a view similar to FIGURE 2 and specifically illustrates the positional relationship of the various elements of the system when the rear wheel of the assembly is raised.

FIGURE 5 is a view similar to FIGURE 2 and shows the position of the elements of the system when the front wheel and an intermediate wheel are each raised from the horizontal.

FIGURE 6 is an enlarged fragmentary elevational view with portions broken away to clearly illustrate the medial portion of the entire system.

FIGURE 7 is an enlarged fragmentary elevational view showing the rear overload spring assembly with portions thereof broken away to more clearly illustrate the structure.

FIGURE 8 is a section taken along the line 8—8 of FIGURE 7.

FIGURE 9 is a fragmentary top plan view of a portion of the elements of the system shown in FIGURE 7.

FIGURE 10 is an enlarged fragmentary elevational view of the track-adjusting and tensioning means.

FIGURE 11 is a vertical sectional view taken along line 11—11 of FIGURE 10 showing the track-adjusting and tensioning means.

FIGURE 12 is a plan view of a vehicle frame incorporating a two-wheel suspension system, in accordance with the present invention on both sides thereof.

FIGURE 13 is a side elevation of the structure shown in FIGURE 12 and is partially broken away for convenience.

FIGURE 14 is a rear elevation of the structure of FIGURE 12 and illustrates the fact that a load carrying body may be welded or otherwise secured to the frame vehicle.

FIGURE 15 is an enlarged, fragmentary, horizontal section taken along the line 15—15 in FIGURE 14.

FIGURE 16 is a longitudinal, vertical section taken along the line 16—16 in FIGURE 18 and illustrates a representative side of the vehicle of FIGURE 18 showing the wheel suspension system thereof.

FIGURE 17 is similar to FIGURE 16 and illustrates an alternate embodiment of the invention wherein the interior bell cranks of the wheel suspension system are configured somewhat differently from that shown in FIGURE 16.

FIGURE 18 is a rear elevation of a vehicle frame incorporating the wheel suspension system of one embodiment of the present invention and is related to FIGURES 16 and 17 in the manner above explained.

Figure 19:
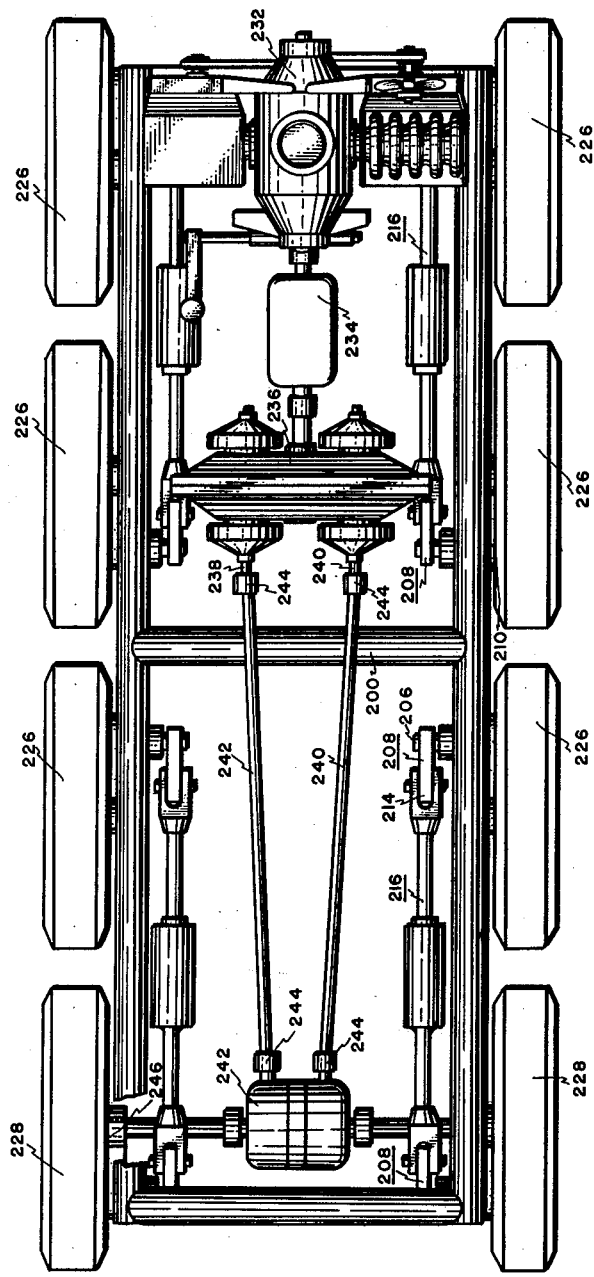
FIGURE 19 is a plan view of a self-propelled vehicle incorporating a wheel suspension system in accordance with the features of the present invention.

Referring to the drawings, there is shown a chassis, generally indicated by numeral reference 10, which includes a pair of parallel spaced-apart longitudinal side frame members 12. These members 12 are preferably formed of tubular metal stock which has been found to exhibit satisfactory mechanical strength while being relatively light in weight. The members 12 are joined transversely by a plurality of tubular members 14, as clearly shown in FIGURE 1.

It will be understood that the wheel suspension system is identical for each side of the vehicle, accordingly for ease of understanding only a single side will be described in detail.

The wheel suspension system comprises a plurality of bearing assemblies 16, 18, 20, 22 which are suitably secured at spaced points along the bottom of the longitudinal side members 12 and each is adapted to pivotally receive its associated shaft 24, 26, 28 and 30. The end portions of these shafts which extend outwardly beyond the side members 12 are provided with arms 32, 34, 36, and 38, respectively. To each of the arms there is secured a stub shaft or axle 40, 42, 44, and 46, respectively, which are individually adapted to rotatably support their respective wheels 48, 50, 52, and 54. These wheels are of the conventional type including a metal hub and a rubber tire.

The ends of the shafts 24, 26, 28, 30 opposite to that to which the arms 32, 34, 36, 38 are secured are adapted to carry arms 56, 58, 60, 62, respectively, as clearly illustrated in FIGURES 2, 3, 4 and 5. The arm 56 of the front wheel assembly is pivotally connected to the next adjacent wheel assembly by a series of linkages. Specifically, the arm 56 of the front wheel assembly is provided with an aperture which receives yoke 63. A pair of tie rods 64, 68 and a turnbuckle 66 interconnect the yoke 63 with a yoke 70. The yoke 70 is pivotally connected to one end of a linkage member 72 while the other end of linkage member 72 is pivotally connected to the arm 58 of the second wheel assembly by a strap member 74.

As illustrated in FIGURE 6 intermediate the ends of the linkage member 72, there is an aperture provided to pivotally receive a yoke 76 which, in turn, is rigidly connected to the extended portion of a spring-biased rod 78 of a suspension spring assembly generally indicated by reference numeral 80. The spring assembly 80 comprises a cylindrical chamber 82, the rod 78, a helical spring 84, and a flanged spring receiving element 86 which is secured to the end of the rod 78 extending within the chamber 82. The end of the chamber 82 opposite that from which the rod 78 extends is pivotally connected to a linkage member 88 at 90. By virtue of the construction of the spring assembly 80, the linkage elements 72 and 88 are constantly being urged toward one another with a force equal to the expansion force of the spring 84.

The lower portion of the linkage element 88 is pivotally connected with the arm 60 of the third wheel by a strap 92 which, in turn, extends to a linkage element 94 as will be clearly apparent from an examination of FIGURE 7. The upper portions of the linkage elements 88 and 94 are connected together by a tie rod 95 having yoke ends 96 and 98 for pivotally interconnecting the linkage elements 88 and 94 respectively.

The upper portion of the linkage element 94 also is connected to the arm 62 of the rear wheel by a tie rod 100 provided with yokes 102 and 104 which pivotally engage the linkage element 94 and the rear wheel arm 62, respectively.

An overload spring assembly generally indicated by reference numeral 106 and clearly illustrated in FIGURE 7, has one of its ends pivotally connected to the linkage element 94 medially of the end thereof as at 108. The opposite end of the spring assembly 106 is connected to a bracket 110 which is welded or otherwise suitably secured to the chassis element 12. It will be noted that the overload spring assembly consists essentially of a cylindrical chamber 112, a rod 114, an inner cylinder 116 disposed concentrically with respect to the outer cylinder 112 and adapted to receive the inner end portion of the rod 114, and a helical spring 118. The outer end portion of the rod 114 is provided with threads which are adapted to receive threaded fasteners whereby the extended portion of the rod 114 may be disposed within a suitable aperture in the bracket 110 and may be positioned relative thereto by the threaded fasteners which engage the threaded portion 120. Further, it will be noted that the rod 114 is provided with a radially extending shoulder or flange 122 against which one end of the spring 118 may act. The overload spring assembly 106, as will be noted, is fastened into the wheel suspension system in such a manner that the assembly exerts a force forward on the rear wheels through the bracket 110 which is welded to the frame member 12 and the push-type spring unit.

The side rails 12 of the chassis extend rearwardly and upwardly and terminate in journal member 124. Axles of the drive sprockets or wheels 126 are mounted to rotate within the journals 124. An open center track 128 is disposed about the drive wheels 126 and around the wheels 48, 50, 25, and 54. It will be appreciated that the drive sprockets or wheels 126 are driven by a motor and associated power transmission means in the conventional manner as shown schematically in FIGURE 1.

In order to maintain the desired tension of tracks 128, a track-adjusting and tensioning means is provided and shown specifically in FIGURES 10 and 11. It will be noted that a split-sleeve bracket 130 is welded to the side rails 12 of the chassis.

The bracket 130 is adapted to telescopically receive a rod 132 which will move freely within the bracket 130 until the threaded fasteners 134 are tightened. The front wheel bearing assembly 16 is suitably fastened to one end of the rod 132. The other end of the rod 132 is reduced in diameter and threaded as at 136, and projects into an aperture formed within a bracket 138 which is secured to and depends from the side rails 12.

In order to take up any slack which may occur in the endless track 128, the fasteners 134 of the split-sleeve bracket 130 are loosened and the associated bearing assembly 16 mounted on one end of the cylinder 132 is moved forward by tightening a nut 140 which engages the threaded portion 136 of the rod 132. It will be appreciated that as the front bearing assembly 16 is moved relative to the bracket 130, the turnbuckle 66 which interconnects the arms 56 and 58 of the front and the second wheel assembly must be adjusted in accordance therewith.

Structurally, it is necessary to note that on the two center wheels the retaining arms 58 and 60 are at right angles to their respective arms 34 and 36 which are welded to their respective offset axles, and that on the front and rear, the arms 56 and 62 lead rearwardly and forwardly, respectively, thus avoiding the rocking or baby-buggy effect when the vehicle is accelerated, decelerated, or the brakes are applied. Referring to FIGURES 2, 3, 4 and 5, as the arms 56 and 62 on the front and rear axles are drawn down the effective moment arm will be decreased and as the wheels rise, the effective moment arm is increased. It will be appreciated that such occurrence provides a stabilizing effect which keeps the frame or chassis from rocking ahead or rocking backwardly and remaining in a tilted position. Manifestly, the relative disposition of the arms 32 and 56 of the front wheel assembly and the arms 38 and 62 of the rear wheels assembly is of principal consideration in the operation of the present wheel suspension system.

The co-relationship of the various elements of the wheel suspension system will be noted from an examination of FIGURES 2 through 5 wherein there is shown the wheel suspension system and associated chassis traversing various types of terrain. FIGURE 2 illustrates the wheel suspension system when at rest or traveling over smooth terrain.

FIGURE 3 shows the wheel suspension system wherein the front wheel assembly has encountered a rise in the ground. It will be noted that as the front wheel commences to rise, the arms 32 and 56 pivot about the bearing assembly 16 and the resultant effective moment arm of the arm 56 is increased. The movement of the arm 56 of the front wheel assembly is then transmitted to the corresponding arm 58 of the next adjacent wheel assembly through rods 64, 68, linkage 72 and strap 74. Inasmuch as the arms 34 and 58 of the second wheel assembly are fixed relative to one another, there will be no movement effected in the second wheel assembly solely as the result of the movement of the front wheel assembly. The only movement thereof will be effected by the upward movement of the entire chassis framework which causes the bearing assemblies 16, 18, 20, and 22 to move upwardly with the chassis which in FIGURE 3 pivots about a point in the region of the rearmost bearing assembly 22. As the front wheel assembly moves upwardly, a force is transmitted through the linkage elements to the next adjacent wheel assembly wherein the force attempts to rotate the arms 34 and 58 of the adjacent wheel assembly about or within the bearing 18. However, due to the fact that the wheel 50 is on solid terrain, a portion of this force results in a force tending to push the chassis frame 12 upwardly. The remaining portion of the force is transmitted through the suspension spring assembly 80 to the linkage elements of the third wheel assembly. Here, as in the case of the second wheel, the force tends to rock the wheel 52 downwardly. Due to the fact that the wheel 52 is on solid terrain, such movement cannot be effected and thus the force is transmitted upwardly against the chassis through the side rail 12. The remaining force is transmitted to the rearmost wheel assembly through the associated linkage to the arm 62 whereupon the wheel 54, due to the fact that it is resting upon the ground, cannot be moved downwardly and the chassis is urged upwardly.

FIGURES 4 and 5 are illustrative of other positions of the wheels showing the co-relationship of the various elements of the system. Specifically, FIGURE 4 shows the system wherein the rear wheel assembly has been raised and FIGURE 5 shows the system where the front and one of the intermediate wheels have been raised.

In certain applications a shock resistant bumper pad may be inserted within the cylindrical chamber 82 of the spring assembly 80 which will militate against an objectionable clatter which might occur when the system is employed to traverse very rough terrain. More specifically with reference to FIGURE 6, a piece of belting in order of 5/16 inch thick would be inserted within the chamber 82 between the closed end thereof and the flanged spring receiving element 86.

In view of the foregoing description, it will be seen that the instant invention has provided a wheel suspension system in cooperation with the light tubular frame or chassis wherein the stress of the wheel suspension is borne by the frame along a frame tube member wherein the major stress results in a compression force along this tube. That is, as the front wheel is urged upwardly by a rise in the terrain, the force imposed on the system thereby is distributed through the linkage elements and impressed on the chassis at distributed points therealong. Further, it will be noted that the individual wheels of the assembly have a wide range of rise and fall permitting travel over irregular terrain and providing that the stress of a bump on the front corner of the associated vehicle will not be carried corner-wise throughout the entire chassis and framework to the opposite wheel in the same intensity as would be the case if the wheels were spring-mounted on the corners of the frame as in the cases of automotive equipment.

By virtue of the fact that the linkage elements of the system sustain considerable movement, when the system is employed in snowy regions the snow will be shaken free of the linkage and the absence of bracings to carry the snow results in an excellent design insofar as clogging and icing is concerned.

The overload spring assembly 106 shown specifically in FIGURE 7 is fastened into the overall structure in such a manner that it simply exerts a force forward on the four rear wheels through the associated bracket 110 which is welded to the frame 12 and the push-type spring assembly. This overload, however, does not restrict the toggle effect of the linkage system but simply tends to hold back end of the vehicle up by adding a local spring under the cargo carrying compartment of the supported vehicle.

In FIGURES 12 through 15 is illustrated a vehicle frame incorporating a two-wheel suspension system on both sides thereof. Frame 142 includes longitudinal tubular members 144 and 146 and also front and rear transverse tubular members 148 and 150. Preferably the frame 142 is an all tubular, welded construction. Other constructions might conceivably be used, of course. However, it will be desired in many overland type vehicles that the frame be as light in weight as possible as is illustrated in the present tubular construction. Drawbar yoke 152 is connected to lugs 154 and 156 by attachments 158 in a conventional manner.

The four bell cranks 160 each include pivot means 162 in the form of a stub shaft as shown in FIGURE 15. This stub shaft (pivot means 162) is journalled within a pair of spaced bronze bushings 164 which are spaced apart by sleeve 166 within the tubular member 148 of frame 142. The right hand bushing may be seated in a stepped shoulder 168 and the combination secured in place by snap ring means 170 suitably disposed in interior recess 172 of tubular member 148.

Bell cranks 160 also include a wheel supporting arm 174 and a linkage arm 176 integral therewith. Wheel supporting arm 174 may be thought of as rigidly interconnecting the wheel axle 178 of the bell crank with pivot means 162, and also as being integral with linkage arm 176, with the juncture of the two proximate the stub shaft 162. Wheels 180 are journalled to their respective axles 178 of the individual bell cranks 160 in a conventional manner.

A means 182, conceivably in the form of a segmented tie rod having an intermediate spring 184, may be used to connect the ends of linkage arm means 176. Tie rod segments 186 and 188 are connected to linkage arm 176 in the usual manner by conventional attachments 190. The spring means 184 in a preferred form of the invention will include a compression spring 192 disposed within spring housing 194 and actuated by the enlarged head 196 of tie rod segment 186.

The construction as to the tie rod connecting means, the four bell cranks with their component parts and their connection to frame 142 and wheels 180 is the same on both sides of the vehicle 176. The frame 142 may also have welded thereto or otherwise secured thereto a body 198.

The structure above described and illustrated in FIGURES 12 through 15 is very useful both as a tow vehicle and also as a self-propelled vehicle. The suspension system employed thereby offers great stability and is a marked improvement over structures the bell cranks of which employ linkage arms which are disposed 90° with respect to the respective wheel supporting arms, since, in the embodiment of the invention shown, the linkage arm means are disposed at angles less than 90° with respect to their wheel supporting arms 174. Thus, if one of the front wheels 180 traverses a bump in the road, both the frame and the wheel at that point will rise, but the wheel more than the frame. This serves to increase the effective moment arm of the respective linkage arm means 176, serving to increase the effect of the reaction force within the segmented tie rod 182, and also shortens the effective moment arm of wheel supporting arm 174, thus reducing the torque imposed upon the bell crank by the ground reaction force directed underneath and against the front wheel. Hence, peak impact loads are minimized. Further, the effective increase in the moment arm of linkage arm 176 and the effective decrease in the torque arm of wheel supporting arm 160 act in concert, in aid of each other, so that the reaction force produced by the remaining wheel through the tie rod connecting means 182 will tend to strengthen the load carrying capacity of the front end of the vehicle at the wheel affected and will otherwise operate to restore the vehicle to its original operating condition.

While the two linkage arms 176 need not both have an acute angle relationship relative to their respective wheel supporting arms, it is desirable that this be the case, so that the movement of both bell cranks will be mutually reciprocal. The spring means 184 simply serves to cushion road shock.

In the embodiment of the invention as illustrated in FIGURES 16 and 18, the frame 200 preferably includes depending members 202 which have integral journals 204 for pivotally receiving and journalling pivot means 206 of each of the bell cranks 208. Wheel supporting arms 210 of each of the bell cranks 208 interconnect and are integral with the pivot means 206 and the several wheel axles 212. Linkage arm means 214 rigidly join their respective wheel supporting arms 210 through the interposed pivot means 206. Intercoupling means 216, in the form of tie rod segments 218 and 220 together with a resilient shock absorber means 222, interconnect the ends of linkage arms 214 as shown. Attachments 224 are conventional and provide pivotal connections for the extremities of the intercoupling means 216 to the linkage arms 214. The resilient means 222 may be of the same or similar design as member 184.

It will be noted that the wheel axles 212 of the bell cranks 208, of the respective pairs which are coupled together by means 216, are disposed inwardly or interiorly of the two respective pivot means 206; further, the linkage arms 214 are disposed at an angle less than 90° with respect to their associated wheel supporting arms 210. Wheels 226 are illustrated in phantom line only and are journalled to their respective wheel axles 212 in a conventional manner. The fourth wheel 228 may be in the form of a direct drive sprocket where the vehicle is to be self-propelled, the teeth of the sprocket meshing with the endless track (not shown) disposed to encase the wheels in a conventional manner. Of course, the wheel 228 may also be of similar, general configuration as wheels 226 which in turn may be similar to wheels 180 in FIGURE 12.

It will be noted in connection with FIGURE 16 that, in each of the two sets S and S' of longitudinally spaced wheels, movement about the pivot means 206 of one of the bell cranks 208 will effect movement about the pivot means 206 of the other bell crank 208 of the set. It is important to note that with respect to both sets S and S', the linkage arm means 214 of each of the bell cranks are inclined toward each other, and, hence, are disposed at an angle less than 90° with respect to their respective wheel supporting arms 210. This offers a number of distinct advantages over conventional systems wherein bell crank arms are disposed in 90° relationship. Were all of the linkage arm means in 90° relationship with respect to their respective wheel supporting arms 210, then a number of disadvantages would be present; the effective wheel base of the vehicle would be reduced to merely the distance between the effective pivot points of each wheel couple, which points would be disposed halfway between respective pivot means 206, i.e. between points A and B. However, where the relationship of the linkage arms to their respective wheel arms is an acute angle relationship, as in the invention, then the effective wheel base is lengthened beyond points A and B in FIGURE 16 of the drawings. If the extreme right wheel 226 encounters a bump, then this wheel will rise and the frame also, the wheel more than the frame. This serves to reduce the length of the effective moment arm of wheel support arm 210 and will increase the effective moment arm or torque arm of linkage arm means 214. Hence, wheel load becomes less effective in pivoting the bell crank around about pivot means 206 in a clockwise direction. Correspondingly, the pulling force of interconnecting tie rod means 216 has an increased effect upon forcing the bell crank of this front wheel (assumed) in a counterclockwise direction. Hence, the load carrying capacity of the vehicle at this particular wheel is increased and the vehicle frame is "beefed up," as it were, at this point. Further, and as hereinbefore explained in connection with other embodiments, the impact load is also shared by the next rearward adjacent wheel coupled to the front wheel which tends to pivot in a clockwise direction about pivot means 206 and hence raise the frame at this point. Thus, shear loads are markedly reduced as applied to the frame 200 proper so that a light tubular construction may be employed.

It has been found and may be shown through vector analysis that the effective wheel base of the vehicle is measurably increased. Further, that forward and aft rocking motions of the vehicle, when going over rough terrain, are greatly reduced. Finally, the suspension system by virtue of the special angle relationship above described will tend to restore itself to normal position rather than maintain a tipped disposition while traversing undulating terrain.

The wheels in each set S and S' operate in tandem so as to produce a restoring force to the wheel affected, tending toward stabilization of the vehicle in travel.

The wheel suspension system illustrated in FIGURE 17 is similar to that shown in FIGURE 16, excepting that the bell crank 208', while corresponding to bell cranks 208 in FIGURE 16, are configured slightly differently in that the linkage arm means 214' is in right angle relationship with respect to wheel supporting arms 210. While, theoretically, the wheel response of the inside wheel will be less satisfactory than that of the outside wheels, by virtue of the special angle relationship associated with the outside wheels, still the inside bell cranks 208' in having erect linkage means 214' will provide for greater "slack" or movement to accommodate the high impact loads which can occur at the outside wheels. Clearly, the effect of impact loads on the outside wheels, due to vehicle travel over bumpy terrain, is most objectional and must be compensated for first. Where the terrain is excessively bumpy, it may be more desirable to provide for extreme angular displacement o fthe outside bell crank and to enable the same to be accomplished by allowing for more pivotal angular displacement of the inside bell cranks.

Obviously, in order for any system as above described to operate, it is needful that the respective means (pivot means 206) for rotatably mounting the supporting arms 210 to the frame 200 must be positioned at respective points X and Y (see FIGURE 16) which are disposed remote from and outwardly of the wheel axles 212 as shown. To be most effective, the design of the bell cranks should be such that the linkage arm means 214 are respectively integral through respective pivot means 206, with supporting arms 210.

While the bell cranks employed may have the pivot means 162 of FIGURE 15 as pivot means for rotatably mounting the same at the frame, for example, it will be understood that conceivably a pivot means may be made integral with and made fixed to the frame, and the remainder (wheel supporting arm and linkage arm means) simply journalled about the pivot means. However, it is deemed preferably that the former construction and that shown in FIGURE 15 apply. Nonetheless, the term "integral" shall be construed to include both constructions. As to the wheel supporting arm and its associated linkage arm means, the two may be either directly integral (see 174, 176, and 162 in FIGURES 13 and 15) or simply integral or fixedly interdisposed via the pivot means which may be interposed therebetween (see 202, 210 and 206 in FIGURE 16).

In FIGURE 19 is illustrated a complete self-propelled vehicle employing a wheel suspension system of either FIGURE 16 or FIGURE 17, for example. Mounted upon the frame 200 will be an internal combustion engine 232 which preferably shall have a low contour flat design with preferable, low vibration, high torque output characteristics. The internal combustion engine is coupled through a transmission 234 and a clutch and braking unit 236, the output shafts 238 and 240 thereof being coupled through rods 242 and 244, by a respective, double universal joint 244 to the rear transmission box 242. Power therefrom is supplied directly to the rear wheels 228 whatever their form.

Where there are direct independent drives to the individual two rear wheel, then the axle connections may be directly through the wheel supporting arms with suitable journalling 246. The elongate rods 240 and 242 and their universal joints will take up such twisting moments as may develop during vehicle travel, when the two rear wheels are traversing irregular and dissimilar terrain. The rear wheel transmission housing at 242 may be rigidly secured to the frame and the driven lanes therefrom leading to the rear wheels provided with U-joints at both extremities, if desired.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

We claim:

1. A wheel suspension system, comprising a frame; a plurality of wheels, including at least a front wheel, a rear wheel, and an intermediate wheel; a supporting arm for each of said wheels; means rotatably mounting said supporting arms on said frame; linkage arms integral with said supporting arms; and pivotal linkage members interconnecting each of the linkage arms with the linkage arm of the adjacent wheel, the linkage arms of the front and rear wheels being disposed at an angle of less than 90° with respect to their associated supporting arm, and the intermediate linkage arm being disposed at a right angle with respect to its associated supporting arm.

2. A wheel suspension system, comprising a frame; a plurality of wheels, including at least a front wheel, a rear wheel, and intermediate wheel means; a supporting arm each of said wheels; means for rotatably mounting said supporting arms on said frame; linkage arms integral with said supporting arms, the linkage arms of the front and rear wheels being disposed at an angle of less than 90° with respect to their associated supporting arm; pivotal linkage elements interconnecting said linkage arms of the front wheel and the next adjacent wheel means and the linkage arms of the rear wheel and the next adjacent wheel means forwardly therefrom; and spring means interconnecting said pivotal linkage elements of the wheel means intermediate said front and rear wheels.

3. A wheel suspension system as claimed in claim 1, wherein said pivotal linkage members include an overload spring assembly secured between said frame and linkage arms of one of the rearmost of said wheels.

4. The invention defined in claim 1, wherein the front wheel is disposed rearwardly with respect to the means for rotatably mounting its supporting arm and the rear wheel is disposed forwardly with respect to the means for rotatably mounting its supporting arm.

5. A wheel suspension system for a vehicle, including a frame having transversely spaced longitudinally extending side members; a plurality of wheels including at least a front wheel, a rear wheel and an intermediate wheel longitudinally spaced along each side member, each of said wheels having an axle; a bearing assembly associated with each of said wheels and secured to its respective side member, a wheel supporting arm attached to each of said axles for rockably mounting each of said wheels to its respective bearing assembly; a linkage arm integral with each supporting arm, pivotal linkage members interconnecting each of the linkage arms with the linkage arm of the adjacent wheel, the linkage arms of the front and rear wheels each being disposed at an angle of less than 90° with respect to its associated arm and the intermediate linkage arm being disposed at right angles with respect to its associated supporting arm, the front wheel being disposed rearwardly with respect to its associated bearing assembly for its supporting arm, and the rear wheel is disposed forwardly with respect to its associated bearing assembly for rockably mounting its respective supporting arm.

6. A wheel suspension system, including in combination a frame; two longitudinally spaced wheels; respective supporting arms for said wheels; respective axle means journalling said wheels and carried by said supporting arms; respective pivot means rotatably mounting said supporting arms on the frame at positions spaced from and disposed outwardly with respect to said axle means; linkage arms secured to said supporting arms, respectively, in fixed relation thereto, one of said linkage arms being disposed at an angle of less than 90° with respect to its supporting arm; and means interconnecting said linkage arms, so that upward movement of one supporting arm will effect downward movement of the other supporting arm, and vice versa, said interconnecting means including a housing connected to one of said linkage arms, a flange in said housing connected to the other of said linkage arms, and a spring positioned between the flange and the housing.

7. A wheel suspension system for a vehicle, including in combination a frame; two sets of wheels disposed, respectively, at opposite sides of said frame, each set comprising two longitudinally spaced wheels; two sets of longitudinally spaced bell cranks disposed, respectively, at opposite sides of said frame, each bell crank having pivot means journalling it to said frame, an axle journalling one of said wheels at a position disposed between said bell crank's pivot means and the pivot means of the other bell crank of its set, a supporting arm rigidly interconnecting said wheel axle and said pivot means, and a linkage arm secured to said supporting arm in fixed relation thereto, each of said linkage arms being disposed at an angle less than 90° with respect to its supporting arm; and respective resilient means for said sets of bell cranks, each of said resilient means including a housing connected to one linkage arm of its set, a flange in said housing and connected to the other linkage arm of the set, and a spring positioned between the flange and the housing.

8. A wheel suspension system for a vehicle, including in combination a frame; a plurality of longitudinally spaced sets of wheels, said sets being disposed in pairs at respectively opposite sides of said frame, each set comprising two longitudinally spaced wheels; a corresponding plurality of longitudinally spaced sets of bell cranks operatively associated with the respective sets of wheels, each bell crank having pivot means journaling it to said frame, an axle journalling one of said wheels at a position disposed between said bell crank's pivot means and the pivot means of the other bell crank of its set, a supporting arm interconnecting said axle and said pivot means, and a linkage arm secured to said supporting arm in fixed relation thereto, the linkage arms of the most forward and the most rearward of said bell cranks, at each side of said frame, being disposed at an angle less than 90° with respect to its supporting arms; and means interconnecting the linkage arms of the respective sets, said means including a housing connected to one linkage arm of each set, a flange in said housing connected to the other linkage arm of each set, and a spring positioned between said housing and said flange.

9. Structure according to claim 8, wherein all of the linkage arms are disposed at angles less than 90° with respect to their supporting arms.

10. Structure according to claim 8, wherein the remaining linkage arms are disposed at substantially right angles to their respective supporting arms.

References Cited in the file of this patent
UNITED STATES PATENTS

| | | |
|---|---|---|
| 1,928,545 | Rondier | Sept. 26, 1933 |
| 2,013,994 | Schutte | Sept. 10, 1935 |